United States Patent [19]
Yanosy, Jr. et al.
[11] Patent Number: 4,789,981
[45] Date of Patent: Dec. 6, 1988

[54] SYSTEM FOR PROVIDING DATA SERVICES TO A CIRCUIT SWITCHED EXCHANGE

[75] Inventors: John A. Yanosy, Jr., Stratford; Jitender K. Vij, Trumbull; Santanu Das, Shelton, all of Conn.
[73] Assignee: Alcatel N.V., Amsterdam, Netherlands

[21] Appl. No.: 122,497
[22] Filed: Nov. 16, 1987

Related U.S. Application Data

[63] Continuation of Ser. No. 705,462, Feb. 25, 1985, abandoned.

[51] Int. Cl.[4] .......... H04Q 11/04
[52] U.S. Cl. .......... 370/58; 370/110.1
[58] Field of Search .......... 370/60

[56] References Cited

U.S. PATENT DOCUMENTS

| | | | |
|---|---|---|---|
| 4,413,337 | 11/1983 | Dauphin et al. | 370/110.1 |
| 4,476,559 | 10/1984 | Brolin et al. | 370/110.1 |
| 4,488,294 | 12/1984 | Christensen et al. | 370/110.1 |
| 4,512,017 | 4/1985 | Nici et al. | 370/110.1 |

*Primary Examiner*—Douglas W. Olms
*Assistant Examiner*—Wellington Chin
*Attorney, Agent, or Firm*—Peter C. Van Der Sluys

[57] ABSTRACT

A system for providing data services in an evolutionary fashion as well as providing access to external data communication networks for subscribers to a circuit switched voice exchange includes a data services adjunct connected in series with presently existing voice communication paths.

16 Claims, 4 Drawing Sheets

TO PCM BUS
PCM BUS I/F
48
CONTROLLER
88
LOOP CONTROL
86
CODE/FILTER
80
TELEPHONE FUNCTIONS
82
RING DETECT AND HOOK CKT
84
78
18
TIP
RING
TO CKT SWITCHED EXCHANGE
CKT SWITCHED EXCHANGE I/F
38

70
92
SDL
DECODE
MODE CONTROL
96
90
94
105
104
14
114
116
DMA
112
ROM
CODEC/ FILTER
100
USART
102
RAM
110
μP
108
103
98
PHONE I/F
SUBSCRIBER TERMINATION DEVICE
BUS I/F
106
28
26
DATA PERPH.

SYSTEM FOR PROVIDING DATA SERVICES TO A CIRCUIT SWITCHED EXCHANGE

This is a continuation of co-pending application Ser. No. 705,462 filed on Feb. 25, 1985 now abandoned.

CROSS-REFERENCE TO RELATED APPLICATIONS

This application is related to one, or more, of the following U.S. patent application Ser. Nos. 670,682; 670,701 both filed on Nov. 13, 1984. Ser. Nos. 705,456; 705,457; 705,458; 705,459; 705,460; 705,461; 705,463; 705,465; 705,464 all filed on even date herewith. All of the above applications are assigned to the assignee hereof.

BACKGROUND OF THE INVENTION

The present invention generally relates to a system for providing data services to a circuit switched exchange and, in particular, relates to such a system having a data services adjunct serially interconnected with an existing voice communication path.

The recent development of data oriented devices has impacted substantially every business, regardless of its size. However, the efficient integration and use of such devices have yet to be fully realized. One reason is that the maximum use of such data devices and services requires the full interconnectivity and access thereto by all subscribers to such a related system. For example, in an envisioned electronic office the accounting department would need full interconnectivity with inventory records, sales, and etc. and management would need full interconnectivity to productivity, inventory and other manufacturing information.

Ultimately, a fully integrated voice/data network is anticipated not only for local offices but for entire communication networks. Perhaps one primary reason for such integration is that during a telephone call the actual information conveyed is comparatively quite small with respect to a data system over the same time period. Further, a data network is characterized in that the data transmissions are most frequently in the form of relatively short bursts of high data rate information. Hence, the use of a single pair of wires as they presently exist for telephonic services is not unreasonably considered as a path for integrated voice/data services.

Perhaps the largest impediment to such a full voice/data integrated network is the fact that most telephonic services are provided by what is generally referred to as circuit switched exchanges. As used herein the phrase "circuit switched exchange" is intended to include all analog exchanges and all non-packet digital exchanges. The essential characteristic of circuit switched exchanges that is a detriment to the use thereof for data services is that a circuit switched exchange sets up a path across a network prior to the initiation of any communication i.e. conversation, and maintains that same path during the entire conversation, thereby locking out the use of that path from others. Further, such a path is removed only after all information has been communicated. As well known, during any conventional telephone conversation there exists many periods of time when the line is not actually conveying information but during which time no other party can access that line to transmit data. Naturally, in a integrated voice/data network these intervals could be used to transmit bursts of data to a data peripheral connected via the same twisted pair of wires. As a consequence, a circuit switched exchange, in the presence of an integrated voice/data system, would necessarily be obsolete and need to be replaced by, for example, a digital switching exchange.

As it happens the majority of businesses that are presently considering full utilization of data services most likely own a circuit switched exchange, frequently known as a private automatic business exchange (PABX). In addition, present trends indicate that data services are usually provided, in the evolutionary sense, at least initially, to a relatively small number of offices or personnel. This is generally accomplished on a line-by-line basis by means of what has become commonly known as a modem link. Quite obviously such a scheme can become extremely expensive and can only provide limited services as more and more offices and personnel are provided with full data services. In addition, data transmissions via such a modem must still use the circuit switched exchanges and are thus subject to the path management difficulties associated therewith.

At the present time the primary alternative to the extensive use of modems is the installation of a local area network (LAN). A local area network usually requires a separate digital switching system as well as the wiring of the entire building to be provided with data services. Consequently, companies presently seeking to grow into full electronic offices are faced with three choices, i.e. the massive use of modems, the use of a LAN, or the removal of the present circuit switched exchange and installation of a fully integrated voice/data switch. As a consequence, many businesses feel forced into expensive and inappropriate compromises in many data services areas and often must give up a circuit switched exchange that has many useful years remaining.

SUMMARY OF THE INVENTION

Accordingly, one object of the present invention is to provide a system for providing data services to a circuit switched exchange without any disruption of the present telephonic services and having the ability to evolve, as needed, into a fully integrated voice/data network at the time of obsolescence of the circuit switch exchange.

This object is accomplished, at least in part, by a system having a data services adjunct that is, effectively, connected in series with an existing voice communication path.

Other objects and advantages will become apparent to those skilled in the art from the following detailed description read in conjunction with the appended claims and the drawings attached hereto.

DETAILED DESCRIPTION OF THE INVENTION

Figure 1:
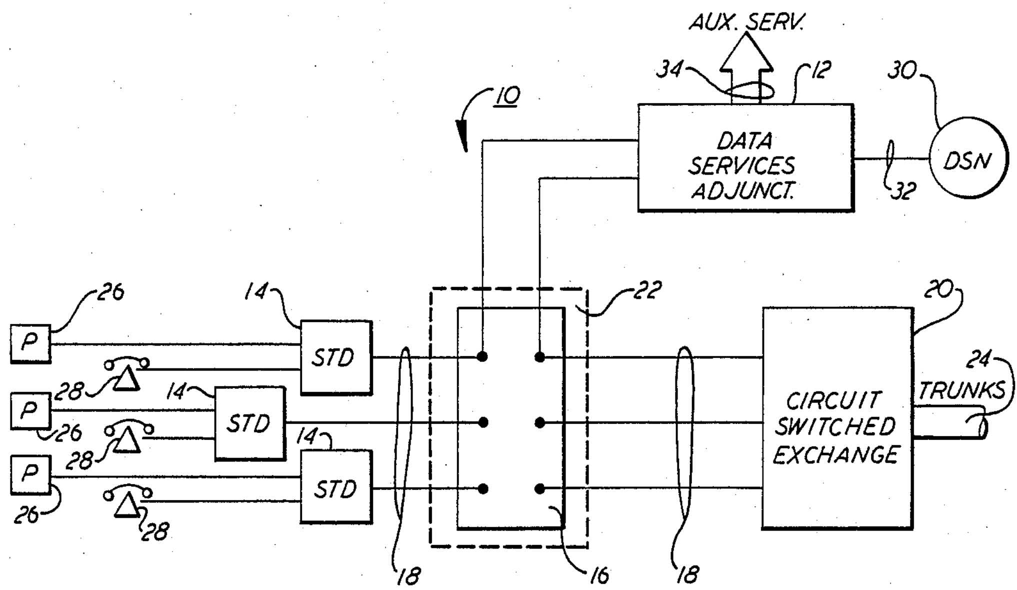
FIG. 1 is a block diagram of a system embodying the principles of the present invention.

A system, generally indicated at 10 in FIG. 1 and embodying the principles of the present invention, for providing data services for use with a circuit switched exchange includes a data services adjunct 12, one or more subscriber termination devices 14, and means 16 for interconnecting the data services adjunct 12 in series with existing voice communication lines 18 of a circuit switch exchange 20. As shown, the circuit switch exchange 20 has a main distribution frame 22 (MDF) associated therewith into which subscriber lines are connected. In the preferred embodiment, the circuit switch exchange 20 is a private automatic business exchange (PABX) having the subscriber lines connected thereto from the MDF 22 and a trunkline 24 therefrom to, for example, a central office exchange (not shown in the drawing).

Each of the plurality of subscriber termination devices 14 is adapted to interconnect, on the subscriber side thereof, with both data peripherals 26 and telephone subsets 28. The switch side of the subscriber termination devices 14 interconnect, via existing voice communication lines 18, to the means 16 for connecting the data services adjunct 12 in series with the existing voice paths 18; for example, in the particular instance where the circuit switched exchange 20 is a PABX, the existing building telephonic wiring. Further, the data services adjunct 12 is adapted to interconnect, with a data networking medium, such as, for example, a digital switching network 30 by means of a communication link 32. The digital switching network can be, for example, the ITT SYSTEM 12 digital exchange and the interconnection of a number of adjuncts 12 thereto can form a data communication network. One such data communication network is described in U.S. patent application Ser. No. 705,463 entitled "Data Communication Network" filed on evendate herewith and assigned to the assignee hereof. This application is deemed incorporated herein by reference. As discussed in the referenced patent application Ser. No. 705,463, entitled "Data Communication Network" a plurality of data services adjuncts 12, i.e. subsystems, can be interconnected via the digital switching network to provide full data intercommunication between and among those data services adjuncts 12. In addition, as more fully discussed below, the data services adjunct 12, preferably, includes a communication link 34 whereby auxiliary services can be made available to the subscribers of the PABX. For example, such auxiliary services as electronic mail, a file server, other terminals, a host processor interface, or the like can be provided via the auxiliary service link 34.

In the preferred embodiment, the means 16 for serially interconnecting the data services adjunct 12 with the existing voice communication lines 18 is of the type described and discussed in U.S. patent application Ser. Nos. 595,108 and 595,120, both filed on Mar. 30, 1984 and entitled "Telephone Line Access System for Main Distribution Frame" and "Telephone Line Access Device for Main Distribution Frame", respectively. The immediately above referenced patent applications are assigned to the assignee hereof and, for the purpose, and to the extent, that they teach the interconnection of an external device in series with existing building wiring at the main distribution frame of a circuit switch exchange, they are deemed incorporated herein by reference. As discussed therein, the access to individual subscriber lines at the main distribution frame 22 is critical to providing services to all subscribers of the exchange. The device and system described accomplishes exactly that purpose with the primary advantage that the existing wiring on the PABX side of the main distribution frame 22 is undisturbed.

Figure 2:
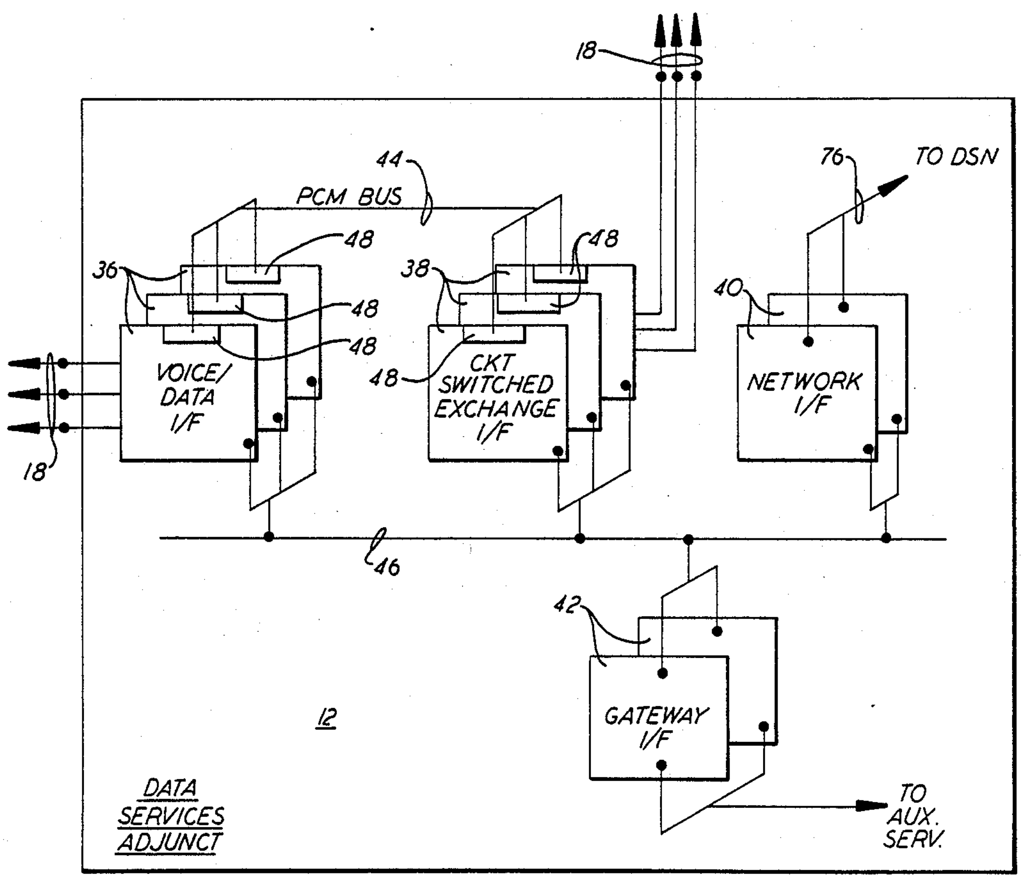
FIG. 2 is a block diagram of a data services adjunct useful as shown in FIG. 1.

A block diagram of one preferred embodiment of a data services adjunct 12 is shown in FIG. 2. The adjunct 12 preferably includes a plurality of voice/data interface devices 36, a plurality of circuit switched exchange interface devices 38, at least one network interface device 40 and, preferably, at least one gateway interface device 42. As depicted each device, 36, 38, 40 and 42, is preferably implemented on a separate single printed circuit board assembly to provide modularity in function and growth. In addition, the voice/data interface devices 36 and the circuit switched exchange interface devices 38 are interconnected via a PCM bus 44 as well as by an internal adjunct bus 46. The internal adjunct bus 46 also interfaces with the network interface devices 40 and the gateway interface devices 42. As more fully discussed hereinafter, each voice/data interface device 36 and each circuit switched exchange interface device 38 includes a PCM bus interface device 48 which PCM bus interface devices 48, as more fully discussed below, ultimately provides all voice services to subscribers interfaced with the data services adjunct 12. The internal adjunct bus 46, having the voice/data interface devices 36, the circuit switched exchange interface devices 38, the network interface devices 40 and the gateway interface devices interconnected thereto, provides all internal data communication services to the data services adjunct 12. As shown, the network interface devices 40 provide the necessary functions to interface each data services adjunct 12 to a data networking means, such as the digital switching network 30, whereas the gateway interface devices 42 provide the necessary functions to interconnect each data services adjunct 14 to the auxiliary services selected by the provider of subscriber services. One apparatus particularly adapted to provide the services and functions of the data services adjunct 12 is described and discussed in U.S. patent application Ser. No. 705,464 entitled "Communication Subsystem" filed on even date herewith and assigned to the assignee hereof. This application is deemed incorporated herein by reference.

The network interface devices 40, in the preferred embodiment, are substantially identical to those described in the immediately above-referenced patent application and effectively provide the service of interconnecting each data services adjunct 12 with, for example, the digital switching network 30. The gateway interface devices 42 that provide communication for auxiliary services can be implemented by use of conventional design mechanisms and the design based and dependent upon the relevant communication protocols. That is, as discussed in the referenced application Ser. No. 705,464 entitled "Communication Subsystem" and Ser. No. 705,463 entitled "Data Communication Network", such an adjunct 12 would preferably exchange all data information along the internally adjunct bus 46 according to a uniform network protocol. Hence, the gateway interface devices 42 must then primarily serve as a means for executing the necessary communication protocol conversion between that uniform network protocol to the communication protocol of the auxiliary service apparatus to enable communication therebetween. The data flow control and other such functions would essentially be provided by the adjunct 12. In fact, one particular flow control scheme is described and discussed in U.S. patent application Ser. No. 705,465 entitled, "Data Subsystem Traffic Control Apparatus and Method" filed on even date herewith and assigned to the assignee hereof. This application is deemed incorporated herein by reference.

In the preferred embodiment, the internal adjunct bus 46, is a multiple access collision detect bus of the type described and discussed in U.S. patent application Ser. Nos. 670,682 and 670,701 both filed on Nov. 13, 1984 and assigned to the assignee hereof. These applications are deemed incorporated herein by reference. By use of such an internal contention bus arrangement the intraadjunct data flow is rapid and is limited primarily by the data transport controller.

Figure 3:
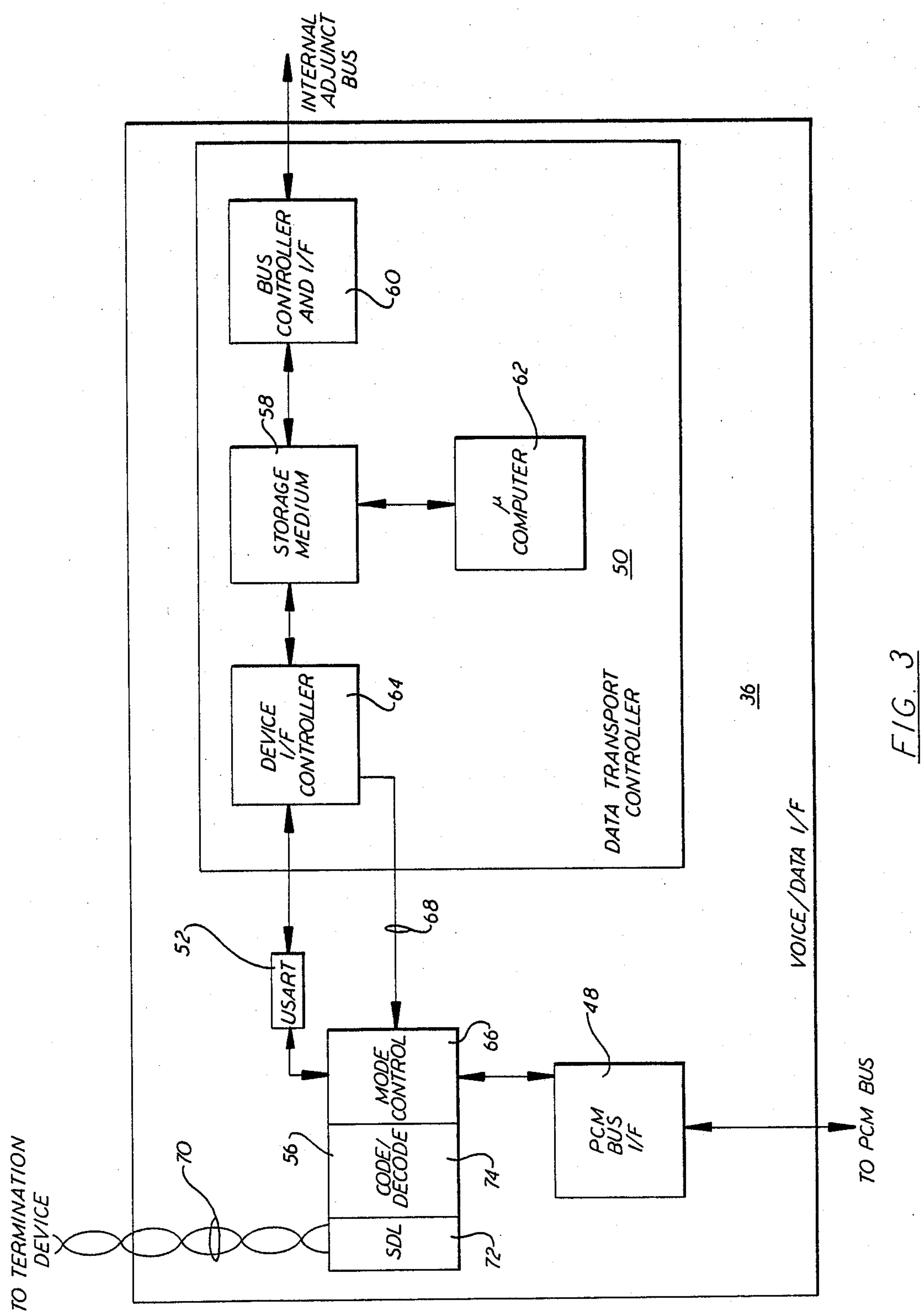
FIG. 3 is a block diagram of one embodiment of a voice/data interface useful in the present invention as shown in FIG. 2.

A more detailed block diagram of a typical voice/data interface device 36 is shown in FIG. 3. Essentially, the voice/data interface device 36 is the same as the peripheral interface device described in the above-referenced patent application Ser. No. 705,464 entitled "Communication Subsystem". The voice/data interface device 36 includes a data transport controller 50, a univeral synchronous/asynchronous receive/transmit (USART) device 52, a PCM bus interface device 48 and a subscriber loop interface device 56. As more fully discussed below, the subscriber loop interface device 56, inter alia, separates or integrates, i.e. multiplexer/demultiplexer, depending on the direction of data traffic, the voice and data information. The USART 52 exchanges data with the subscriber loop interface device 56 whereas the voice information is exchanged with the PCM bus 44 via the PCM bus interface device 48. In the preferred embodiment, the data transport controller is of the type described and discussed in U.S. patent application Ser. No. 705,457 entitled "Data Transport Control Apparatus" filed on even date herewith and assigned to the assignee hereof. This application is deemed incorporated herein by reference. As shown herein the data transport controller 50 includes a storage medium 58, which storage medium 58, as discussed in the immediately above referenced patent application, is effectively equally accessible by a bus controller and interface device 60, a microcomputer 62, and a device interface controller 64. The device interface controller 64 is preferably of the type described and discussed in U.S. patent application Ser. No. 705,458 entitled "Device Inteerface Controller" filed on even date herewith and assigned to the assignee hereof. This application is also deemed incorporated herein by reference. As discussed therein the device interface controller 64 is adapted to support a plurality of peripherals on a single high-speed serial bus. As shown herein, the device interface controller 64, as part of the device specific control program thereof for example, is adapted to provide a mode control signal to a mode controller portion 66 of the subscriber loop interface device 56 via control line 68.

The voice/data interface device 36 interconnects to a subscriber line which, in modern PABX's, consists of a twisted pair of wires 70 providing full duplex service to the subscriber. This interconnection, as discussed above, is accomplished via the means 16. As shown in FIG. 3, the twisted pair 70 enters the voice/data interface device 36 via a short digital loop portion 72 of the subscriber loop interface device 56. The short digital loop portion 72 is preferred in the instance that the circuit switch exchange 20 is a PABX whereby the loop can be arranged according to the transmission mechanisms described and discussed in U.S. patent Ser. No. 596,328, filed on Apr. 3, 1984 and assigned to the assignee hereof. This application describing a short digital loop is also deemed incorporated herein by reference.

For the purpose of the following operational discussion of the short digital loop interface device 56 it is assumed that information is being transmitted to the voice/data interface device 36 by means of the twisted pair of wires 70 from the subscriber termination device 14. The information supported by the twisted pair 70 is conveyed according to any well known digital coding scheme, such as, for example, by the Manchester Coding Scheme. The digital information leaves the short digital loop portion 72 whereupon it is decoded by a decoder portion 74, i.e. a conventional Manchester decoder. In one exemplary system, each frame of data is defined as twenty bits of information and in a Manchester Coding Scheme the first two of these bits entering the decoder portion 74 from the short digital loop portion 70 are synchronization mode control/signalling bits, hence, the remaining eighteen bits are for user purposes. The eighteen remaining bits can be either voice or data and the path through the mode control portion 66 can be previously selected. However, such selection can be changed as the use of data services increases simply by use of a different voice/data interface device 36. Alternately, the mode of operation, i.e. the allocation of the eighteen bits per frame to a voice path or data path can also be changed dynamically by varying one of the bits in the two synchronization bits and assigning bit division of each frame according to the status of that bit.

In the preferred data services adjunct 12, the data tranmission scheme can be described as "2B+D", i.e. there are two 64 kilobit/sec channels (the B channels) available and one 16 kilobit/sec channel (the D channel) in each frame, the allocation being according to the mode selected. Under such a scheme there are three preferred modes of operation which can either be preselected and fixed on a per card basis or controllable by the device interface controller 64. In a first mode the B channel is divided into two 64 kilobits/sec channels (ergo 2B) and supports voice information whereas the D channel supports 16 kilobit/sec packetized data. In a second mode the B channel is divided to support voice information at a rate of 64 kilobits/sec and the data is transmitted at a rate of 80 kilobits/sec i.e. (the second B channel plus the D channel). In the third mode, i.e. an all data mode, the D channel supports 144 kilobits/sec transfer rate. The mode chosen will, of course, be dependent upon each subscribers needs and preferences. If the operating mode is considered fixed then after mode selection, the mode control portion 66 is designed, using conventional logic gates, and counters using, known dynamic bandwith allocation techniques, to provide the following bit-by-bit separation of the user available eighteen bits/frame. In the first mode, i.e. B channel for voice, D channel for data, the first two bits (data) following the synchronization bits are directed to the USART 52 and the remaining 16 bits (voice) are directed to the PCM bus interface device 48. In the second mode, the first 10 bits (data) following the synchronization bits are directed to the USART 52 and the remaining 8 bits (voice) are directed to the PCM bus interface device 48. In the third mode, i.e. "2B+D"

channels for data, all of the user available 18 bits are directed to the USART 52. As a consequence, all data communication information i.e. the voice path is directed to, and only to, the USART device 52 whereas all voice information is directed to, and only to, the PCM bus interface device 48.

From the above it will be understood that the USART 52 receives information from the subscriber termination devices 14 in serial bit streams via the subscriber loop interface device 56. However, since, in a preferred embodiment, the data transport controller 50 is adapted to process data in a parallel fashion the USART 52 performs the serial-to-parallel packaging. In addition, to ensure error free data transmission, the USART 52 provides the bit stuffing and bit removal of a conventional high level data link control protocol (HDLC). Under such an HDLC protocol the system is adapted to provide conventionally known, i.e. recognized throughout the associated network, flags during non-information carrying, or idle, periods. Each flag has a predetermined bit pattern, i.e. 01111110. However, since the same bit pattern can occur during the transmission of a packet this pattern may, in fact, represent valid information. Hence, the HDLC includes, or stuffs, an 0 data bit between the last two binary ones of the stream of six binary ones which stuffing is removed at the receiving end of the transmission where the significance of the bit stream is recognized. In addition, the use of such flags substitutes for a separate "start of packet" or "end of packet" message; that is, when the bit stream changes from the repetitious flag pattern, that change is recognized by that system 10, as indicative of the "start of a packet" signal. Likewise, when the data stream returns to providing only the flag pattern such is recognized as an "end of packet" signal. Such techniques are well known in the art and need not be discussed in further detail herein.

One particular PCM bus interface device 48 that can be advantageously adapted for use with the voice/data interface device 36 is described and discussed in U.S. patent application Ser. No. 682,228 filed on Dec. 14, 1984 entitled "Apparatus for Establishing Communication Paths" and assigned to the assignee hereof. This application is deemed incorporated herein by reference. As discussed therein, the apparatus has a plurality of serial ports terminating therewithin to a time-division-multiplexed (TDM) bus and includes a switch adapted to dynamically assign switch paths which switch is controlled by a switch controller. One particularly suitable switch and associated switch controller are described and discussed in U.S. patent application Ser. Nos. 682,033 and 682,030, both filed on Dec. 14, 1984 and assigned to the assignee hereof. These patent applications are also deemed incorporated herein by reference.

Thus, as used herein the phrase "voice path" or the idiomatic equivalent thereof is an information path, a portion of which includes a TDM signal medium; and the phrase "data path", or the idiomatic equivalent thereof is an information path, a portion of which includes a contention signal medium.

As apparent from the last three referenced patent application Ser. Nos. 682,228, 682,033 and 682,030, the PCM bus interface device 54 receives voice information and establishes the necessary paths to transfer that voice information to the PCM bus 44 which bus 44, for example, can provide, for example, 32 full duplex PCM channels. As known, such multichannel PCM buses are presently fully compatible with, for example, existing ITT SYSTEM 12 digital exchanges. Thus, in the evolutionary development toward a fully integrated voice/data network, the system 10, via the data services adjunct 12 provides, ab initio, for the eventual obsolescence of the circuit switched exchange 20. Further, the voice/data interface device 36 as shown in FIG. 3 separates the voice information from the data information without any deterioration of the voice services.

The data path, upon leaving the network interface device 40, is, preferably, connected directly to the digital switching network 30, via a PCM bus 76, for intercommunication to other data services adjuncts 12. Such interconnection of data services adjuncts 12 to form the data communication network is, effectively, described and discussed in the above-referenced U.S. patent application Ser. No. 705,463 entitled "Data Communication Network".

In one particular implmentation the USART 52 is an 8274 manufactured and market by Intel Corp. of Santa Clara, Calif. The coder/decoder 74 can be a HD6409 manufactured and marketed by Harris Corporation, Semiconductor CMOS Digital Products Division of Melbourne, Fla. and the mode control 66 can be implemented by use of conventional programmable array logic (PAL) devices such as AMPAL 16R8L marketed and manufactured by AMD Corp. of Sunnyvale, Calif., or the functinal equivalent thereof.

Figure 4:
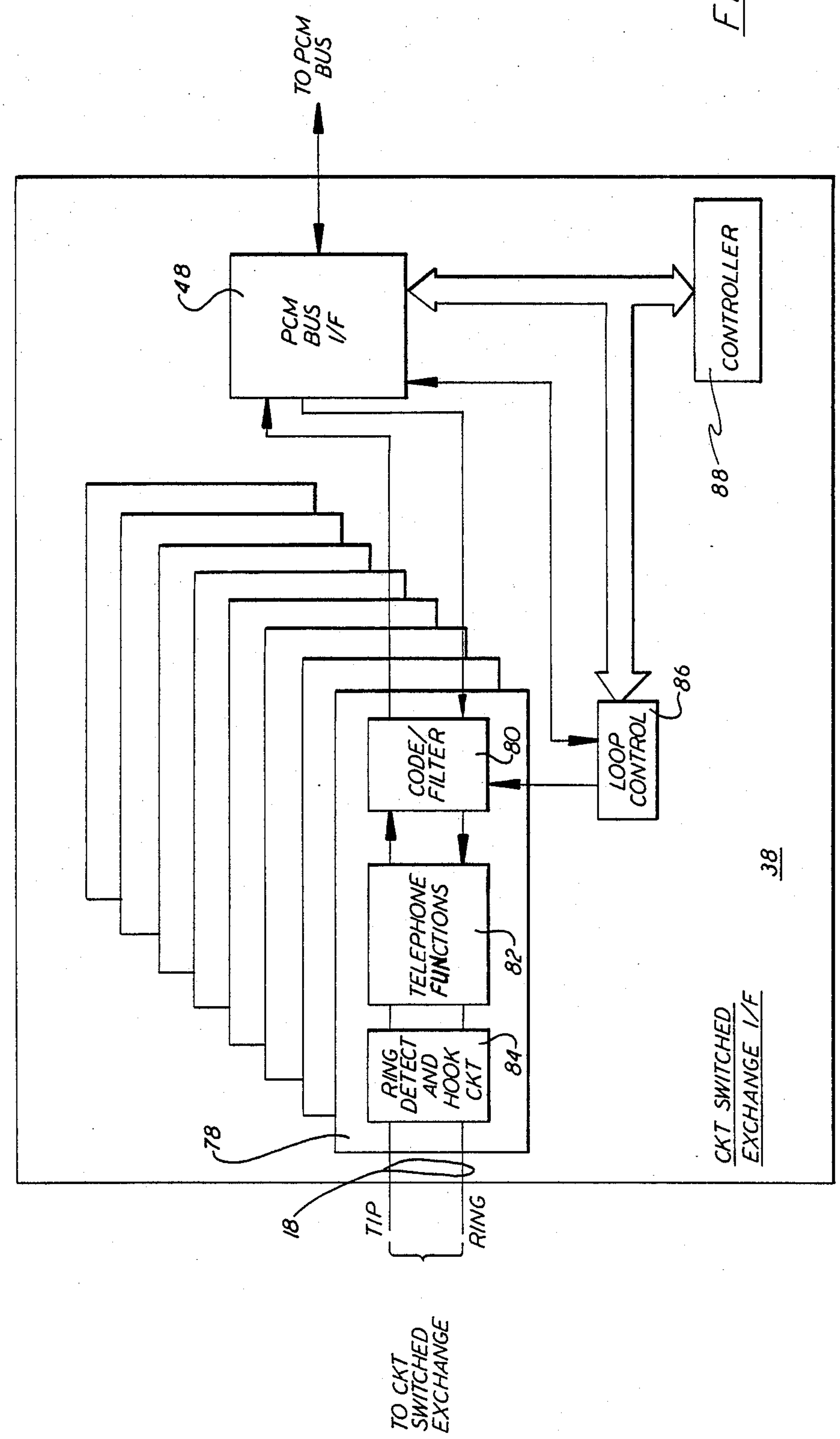
FIG. 4 is a block diagram of a typical circuit switched exchange interface device useful as shown in FIG. 2.

The voice signals, in the early stages of the evolution from a pure voice PABX system to a fully integrated voice/data network, must be retrieved from the PCM bus 44 and converted to the conventional telephone signals acceptable to the PABX. This feature is necessary to ensure that the data services adjunct 12 appears transparent to both the telephonic subscriber and the PABX. Hence, the circuit switched exchange interface device 38 includes, as shown in FIG. 4, a PCM bus interface device 48 and a telephonic services device 78. The telephonic services device 78 includes a CODEC filter 80, a means 82 for emulating telephonic functions and a ring detect and hook circuit 84. The information from the PCM bus 44 is provided to the CODEC filter device 80 that reconverts the encoded signals to a form acceptable by the PABX.

In one embodiment the CODEC filter 80 is an MC 14402 manufactured and marketed by Motorola Inc. of Schrumberg, Ill., although other functionally similar devices are available and can also be used. These signals are then directed through the telephone function emulator 82. Such telephone emulators 82 and ring detect and hook circuits 84 are known in the telephone communication field and the details thereof are not deemed pertinent to the present invention as claimed herein. For example, the telephone emulator 82 can be as MC34011 or MC34013 both being manufactured and marketed by Motorola Corporation. A typical ring detect and off hook circuit is described in U.S. patent application Ser. No. 659,989 filed on Oct. 12, 1984 and assigned to the assignee hereof. The circuit switched exchange interface device 38 additionally includes a subscriber loop controller 86 that provides the forward ring function as well as presents loop closure and channel assignment information to the telephone services device 78. Essentially, the subscriber loop controller 86 receives a control signal from the PCM bus interface device 48 for synchronizing the transfer of data provided from the PCM bus interface device 48 to the telephone services devices 78. In one implementation, the circuit switched exchange interface device 38 includes a controller 88 that, in the preferred embodiment, is a microcomputer, such as the 8031 with associated random-access-memory (RAM) and read only memory (ROM) manufactured and marketed by Intel Corp. of Santa Clara, Calif. The microcomputer 88 interfaces with a parallel port interface carried on the PCM bus interface device 54 and, from the information stored therein, controls the loop controller 86 whereby full telephonic services are provided without deterioration to the subscriber.

In one preferred embodiment, the controller 88 interfaces with the PCM bus interface device 48 by means of an adaptive interface such as that described and discussed in U.S. patent application Ser. No. 682,035, filed on Dec. 14, 1984 and assigned to the assignee hereof. This applicaton is deemed incorporated herein by reference.

Figure 5:
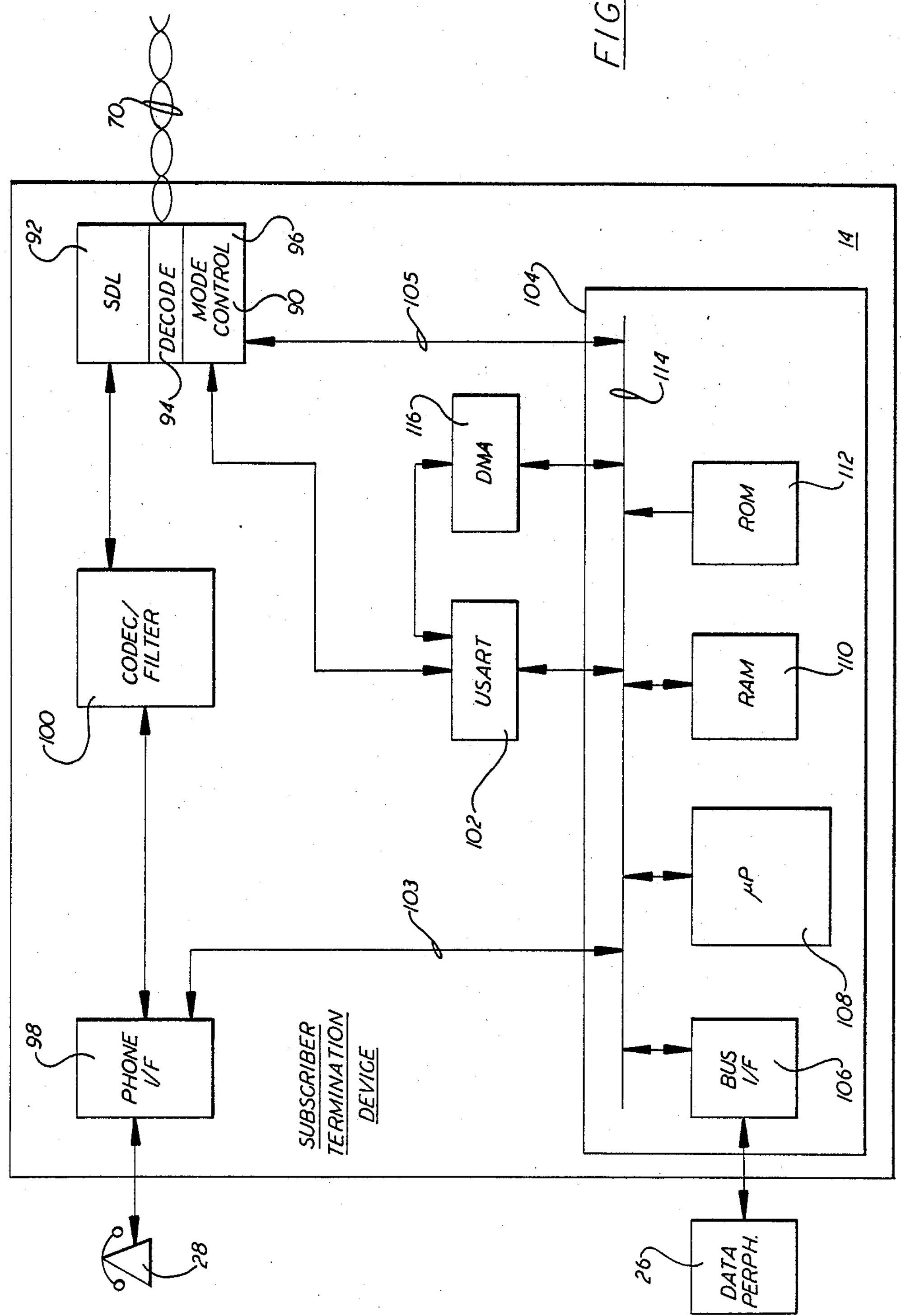
FIG. 5 is a block diagram of a one embodiment of a subscriber terminal device for use in the system of the present invention as shown in FIG. 1.

One particular subscriber termination device 14, adapted for use in the system 10 is shown in the block diagram of FIG. 5. As shown therein, the subscriber termination device 14 includes a subscriber loop interface device 90 substantially identical to the subscriber loop interface device 56 described above and includes an SDL portion 92, an encoding decoding portion 94, and a mode control portion 96. In operation, the voice information, in accordance with the previously exemplary assumed direction of information flow, is initially processed via a conventional telephonic interface 98 and digitized, via a CODEC filter 100. One typical telephone interface 98 is the 3419 manufactured and marketed by Motorola Inc. of Schrumberg, Ill. The data information is exchanged via a USART device 102 that interfaces with a microcomputer 104. The microcomputer 104 is provided with a means 106 for interfacing with a data peripheral. Such interfacing means are well known in the art and need not be described in further detail herein. Preferably, the microcomputer 104 includes a microprocessor 108 having a random-access-memory (RAM) 110 and a read only memory (ROM) 112 associated therewith and interconnected via the local microcomputer bus 114. Thus, the microcomputer 104 provides the data handling for the subscriber termination device 14 such as, inter alia, the packet assembly/disassembly (PAD), between the USART 102 and the data pheripheral 26. In addition, the status of the telephone interface 98 and the mode control portion 96 are monitored by the microcomputer 104 via lines 103 and 105 respectively. In the preferred embodiment, the subscriber termination device 14 further includes a direct memory access device 116, such as a 82324 manufactured and marketed by Intel Corp. of Santa Clara, Calif. adapted to provide the USART 102 with rapid access to information stored therein while nevertheless reducing the interrupt frequency of the microcomputer 104.

In general, the data services adjunct 12 can be expanded in the same manner as the subsystem described in the referenced U.S. patent application Ser. No. 705,464 entitled "Communication Subsystem". That is, the number of voice/data interface devices 36 can be increased to accommodate the number of subscribers to be provided with simultaneous voice and data communication services. Likewise, the circuit switched exchange interface devices 38, as well as the network interface devices 40, can also be modularly increased as the number of subscribers employing the data services adjunct 12 increases.

Ultimately, the present system 10 can be expanded and the plurality of adjuncts 12 can be interconnected via, for example, the digital switching network 30, to eventually provide complete support for all subscribers to the circuit switched exchange 20. Most advantageously, when the circuit switched exchange 20 reaches the end of its useful life, the system 10 can be readily converted to a full service integrated voice/data network simply by the removal of the circuit switched exchange interface devices 38 and directing the PCM bus 44 to the ports of the digital switching network 30 available for that purpose. One such full service voice/data network is described and discussed in U.S. patent application Ser. No. 705,460 entitled "Full Service Voice/Data System" filed on even date herewith and assigned to the assignee hereof. This application is also deemed incorporated herein by reference. In one example, the ITT SYSTEM 12 digital exchange is inherently adapted, by the distributed nature thereof, for just such a conversion. That is, the ITT SYSTEM 12 digital exchange presently operates via a digital switching network which switching network has a plurality of terminal control elements associated therewith. The terminal control elements are fully capable of supporting the necessary PCM links for both data and voice services. Alternatively, as discussed in the above-referenced U.S. application Ser. No. 682,228 entitled, "Apparatus for Establishing Communication Paths" such terminal control elements are not always necessary to establish direct communication between the PCM bus interface device 54 and the digital switching network 30.

The advantages of the system 10 in providing a modular evolution from a relatively small data services adjunct into a fully integrated voice data network are innumerable. Perhaps the most significant advantage, from a business point of view, is the protection of the user's capital investment. Specifically, there is no need to dispose of an acceptably performing circuit switched PABX until the ultimate demise thereof. In addition, the investment in the data services adjunct 12 is not lost since the data services adjunct 12 ultimately expands and evolves into a full feature integrated voice/data PABX to replace the circuit switched PABX. A further significant advantage of the system 10 is that initially, and until the PABX is ultimately replaced, there is no degradation whatsoever with existing telephone communication services.

Although the system 10 has been described herein with reference to a specific embodiment such an embodiment is exemplary in nature as other arrangments and configurations may be implemented without departing from the spirit and scope of the present invention. Consequently, the present invention is deemed limited only by the attached claims and the reasonable interpretation thereof.

What is claimed is:

1. A system for providing data services to subscribers of an existing circuit switched exchange having at least one existing voice communication path, said system comprising:
   - means for interfacing both voice and data subscriber peripherals to said existing voice communication path;
   - means for communicating voice and data information, said means including means for receiving and separating voice and data information, a data information path, connected to said means for receiving and separating voice and data, for communicating data information, a voice information path, separate from said data information path and connected to said means for receiving and separating voice and data information, for communicating voice information, means for interfacing said data information path to a data switching network, and means for interfacing said voice information path to a voice communication path; and connector means, serially connected in said existing voice communication path, for connecting a portion of the existing voice communication path connected to said means for interfacing both voice and data subscriber peripherals to said means for receiving voice and data information and for connecting said voice communication path to a portion of the existing voice communication path connected to said existing circuit switched exchange, whereby said means for communicating voice and data information receives voice and data information from said means for interfacing both voice and data subscriber peripherals via said existing voice communication path and provides voice information to said existing circuit switched exchange via said existing voice communication path.

2. System as claimed in claim 1 further comprising:

means for providing auxiliary services to said subscribers, said means including a gateway interface device connected to said data information path.

3. System as claimed in claim 1 wherein said means for receiving and separating includes means for multiplexing/ demultiplexing said voice information and said data information.

4. System as claimed in claim 3, wherein said means for interfacing said voice information path further includes means for transparently communicating said voice information between said subscriber and said circuit switched exchange.

5. System as claimed in claim 1 wherein said circuit switched exchange is a private automatic business exchange.

6. System as claimed in claim 5 wherein said existing voice only communication path is a plurality of twisted pair of wires, each said twisted pair being assigned to one subscriber.

7. System as described in claim 1, wherein said subscriber peripheral interfacing means includes:

a short digital loop connected to said existing voice communication path;

an encoder/decoder connected to said short digital loop, said encoder/decoder being adapted to operate on digitized information whereby said digitized information is formatted in a consistent manner; and means for multiplexing/demultiplexing voice and data information connected to said voice and data subscriber peripherals and to said encoder/decoder.

8. System as claimed in claim 7 wherein said subscriber peripheral interfacing means further comprises:

a data information path connected between said means for multiplexing/demultiplexing and a data peripheral;

a voice information path connected between said means for mulitplexing/demultiplexing and a voice peripheral; and a USART, said USART being in said data information path.

9. System as claimed in claim 8 wherein said subscriber peripheral interfacing means further comprises:

a voice interface connected to said voice peripheral; and a CODEC filter, said CODEC filter being interconnected between said multiplexing/demultiplexing means and said voice interface.

10. A system for providing data service to subscribers of an existing circuit exhcange having an existing voice communication path, said system comprising:

means for interfacing both voice and data subscriber peripherals to said existing communication path;

means for communicating voice and data information, said means including a voice/data interface device having means for receiving voice and data information and a first PCM bus interface, a circuit switched exchange interface device having a second PCM bus interface and means for outputting voice information, a PCM bus for interconnecting said first and second PCM bus interfaces, means for interfacing with a data network, and an internal bus connected to said voice/data interface device, said circuit switched exchange interface device and said data network interfacing means; and connector means, serially connected to said existing voice communication path, for connecting a portion of the existing voice communication path connected to said means for interfacing both voice and data subscriber peripherals to said means for receiving voice and data information and for connecting said means for outputting voice information to a portion of the existing voice communication path connected to said existing circuit switched exchange, whereby said means for communicating voice and data information receives voice and data information from said means for interfacing both voice and data subscriber peripherals via said existing voice communication path and provides voice information to said existing circuit switched exchange via said existing voice communication path.

11. System as claimed in claim 10 wherein said voice and data information communicating means further includes:

means for providing auxiliary services to said subscribers, said means including a gateway interface device, said gateway interface device being interconnected to said internal bus.

12. System as claimed in claim 10 wherein said voice/data interface device further includes:

a means for interfacing with said connector means.

13. System as claimed in claim 12, wherein said means for interfacing with said connector means includes:

a short digital loop connected to said existing voice communication path;

an encoder/decoder connected to said short digital loop, said encoder/decoder being adapted to operate on digitized information, whereby said digitized information is formatted in a consistent manner; and means for multiplexing/demultiplexing voice and data information connected between said encoder/decoder and said connector means.

14. System as claimed in claim 13, wherein said voice/data interface device further includes:

a data information path connected to said means for multiplexing/demultiplexing;

a voice information path connected to said means for multiplexing/demultiplexing; and a USART, said USART being in said data information path.

15. System as claimed in claim 14 further comprising:

a data transport controller, said data transport controller being in said data information path between said USART and said internal bus.

16. System as claimed in claim 10 wherein said circuit switched exchange interface device includes:

means for exchanging voice information with said voice/data interface device;

a CODEC filter, said CODEC filter being interconnected with said voice information exchanging means;

a telephone emulator; and a ring detect and hook circuit, said voice information exchanging means, said CODEC filter, said telephone emulator and said ring detect and hook circuit forming a portion of a voice information path between said voice/data interface device and said ciruit switched exchange.

* * * * *